United States Patent
Wong

(10) Patent No.: US 9,081,451 B2
(45) Date of Patent: Jul. 14, 2015

(54) CAPACITIVE TOUCH PANEL STRUCTURE

(75) Inventor: Ching Fang Wong, Taichung (TW)

(73) Assignee: CHENFENG OPTRONICS CORPORATION, Taichung (TW)

( * ) Notice: Subject to any disclaimer, the term of this patent is extended or adjusted under 35 U.S.C. 154(b) by 414 days.

(21) Appl. No.: 13/565,110

(22) Filed: Aug. 2, 2012

(65) Prior Publication Data

US 2014/0035860 A1 Feb. 6, 2014

(51) Int. Cl.
*G06F 3/044* (2006.01)

(52) U.S. Cl.
CPC ...................... *G06F 3/044* (2013.01)

(58) Field of Classification Search
CPC ........... G09G 3/36; G06F 3/045; G06F 3/041; G06F 3/044
See application file for complete search history.

(56) References Cited

U.S. PATENT DOCUMENTS

| | | | |
|---|---|---|---|
| 2011/0128240 A1* | 6/2011 | Choi | 345/173 |
| 2012/0050217 A1* | 3/2012 | Noguchi et al. | 345/174 |
| 2012/0086665 A1 | 4/2012 | Song | |

* cited by examiner

*Primary Examiner* — Tony N Ngo
(74) *Attorney, Agent, or Firm* — Muncy, Geissler, Olds & Lowe, P.C.

(57) ABSTRACT

A capacitive touch panel structure comprises a display module, a touch detection module and an optical adhesive layer interposed between the display module and the touch detection module. The display module includes a base substrate, a transistor layer and a filter set that are sequentially stacked, namely the filter set is located on the transistor layer. The touch detection module includes a cover board and at least one touch control electrode grown on the surface of the cover board. The touch control electrode is directly formed on the surface of the cover board, hence the thickness of the capacitive touch panel of the invention can be reduced. The display module and touch detection module are made separately and bonded together via the optical adhesive layer, hence fabrication difficulty is lower and production yield is higher. Thus production speed and productivity are increased, thereby reducing production cost.

6 Claims, 6 Drawing Sheets

CAPACITIVE TOUCH PANEL STRUCTURE

FIELD OF THE INVENTION

The present invention relates to a touch panel and particularly to a capacitive touch panel structure.

BACKGROUND OF THE INVENTION

Arising of touch control technology has revolutionized portable electronic products. Referring to FIG. 1A, a conventional out-cell capacitive touch panel comprises a screen set 1 and a touch control set 2. The screen set 1 includes a first substrate 101, a transistor layer 102, a liquid crystal layer 103, a color filter layer 104, a second substrate 105 and a polarization layer 106 that are sequentially stacked. The touch control set 2 includes a third substrate 201, a touch control module 202 and a cover glass 4 that are sequentially stacked. Also referring to FIG. 1B, the touch control module 202 further includes a first electrode 202a, an isolation layer 202b, a second electrode 202c and a hard cover layer 202d that are sequentially stacked over the third substrate 201. The first electrode 202a and the second electrode 202c are made of transparent conductive material such as indium tin oxide (ITO) to respectively detect touch location in two different directions for confirmation. Because the touch control module 202 must be disposed onto the third substrate 201, the total thickness of the touch panel cannot be reduced. As nowadays the requirement for thin and light electronic products prevails, the difficulty in reducing the thickness of the touch panels has become the biggest issue in the industry. A great deal of effort has been devoted in the industry to reduce the thickness and production cost of the touch panel in order to meet use requirements.

To meet the aforesaid requirements, manufacturers have researched and developed One Glass Solution (OGS) technology of integrating the touch panel and display panel to reduce the total thickness. At present the in-cell touch panel has been developed that includes a touch sensor provided in the liquid crystal panel without adding an extra touch panel outside the liquid crystal panel, thereby reducing the total thickness significantly. However, the touch sensor occupies a portion of the display area, thus a part of the display effect is compromised. Moreover, fabrication process of in-cell touch panels is complex and production yield enhancement is difficult. Furthermore, U.S. publication No. 20120086665 entitled "Liquid crystal display device" discloses a technique of forming an electric field through a common electrode and a pixel electrode to detect user's touch and providing the touch control module disposed inside the liquid crystal panel to reduce total thickness. While this prior art does not have a reduced display area, disposing the touch control module inside the liquid crystal panel still complicates fabrication process and lowers production yield.

In order to solve the aforesaid problems, an on-cell touch panel that integrates the out-cell touch panel and the in-cell touch panel technologies has been proposed to overcome the problem of complex fabrication. Please refer to FIGS. 2A and 2B, the on-cell touch panel includes a first substrate 301, a transistor layer 302, a liquid crystal layer 303, a color filter layer 304, a second substrate 305, a touch control module 306, a polarization layer 307 and a cover glass 308 that are sequentially stacked. By directly disposing the touch control module 306 onto the second substrate 305 without the third substrate 201, the total thickness can be reduced. Moreover, the difficulty of disposing the touch control module 306 onto the second substrate 305 is far less than the fabrication process of the in-cell touch panel, hence this technique is widely accepted and extensively adopted in the industry. However, as the on-cell touch panel has to be fabricated layer by layer, it is time-consuming and results in slow production speed. Furthermore, in the event that the touch control module 306 disposed onto the second substrate 305 is tested to have poor touch detection effect at a test stage, the entire set of the touch panel has to be discarded. Therefore, the total production yield lowers and production cost increases. In addition, as the thinner substrates cannot withstand high temperature processes during fabrication, the electrode of the touch control module 306 is hard to be fabricated onto the second substrate 305, thereby increasing the difficulty of the production process.

Hence how to effectively reduce the total thickness, decrease the fabrication complexity and production cost, and increase the production yield and efficiency of the touch panel has become a common goal of the touch panel producers.

SUMMARY OF THE INVENTION

The primary object of the present invention is to solve the thickness problem of the touch panel and to reduce complexity of fabrication process.

Another object of the invention is to solve the problems of lower production yield and production efficiency and higher production cost.

To achieve the foregoing objects, the present invention provides a capacitive touch panel structure which comprises a display module, a touch detection module and an optical adhesive layer. The display module includes a base substrate, a transistor layer and a filter set that are sequentially stacked, wherein the filter set is located on the transistor layer. The touch detection module includes a cover board and at least one touch control electrode grown on the surface of the cover board. The optical adhesive layer is interposed between the touch control electrode and the filter set to connect the touch detection module to the display module so that the cover board is disposed at one side of the touch detection module that is remote from the filter set.

By the structure described above, compared with conventional techniques, the present invention provides features as follows:

1. The touch control electrode is directly grown on the cover board without the need of adding an extra glass substrate, hence the thickness of the touch panel can be reduced.

2. The touch control electrode is formed on the cover board rather than embedded inside the display module, thus fabrication difficulty can be lower and production yield can be higher.

3. The display module and the touch detection module can be fabricated simultaneously and separately without being made layer by layer sequentially as the conventional techniques do, hence production efficiency can be improved.

4. As the display module and the touch detection module also are brought into production yield tests separately, in the event that the display module or the touch detection module is tested broken, replacement can be made directly, thus solving the problems of conventional techniques that have to be tested after all fabrication processes have been completed and the entire set thereof has to be discarded when defects are found. Therefore, total production yield can be higher and production cost can be lower.

The foregoing, as well as additional objects, features and advantages of the invention will be more readily apparent

DETAILED DESCRIPTION OF THE PREFERRED EMBODIMENTS

Figure 1A:
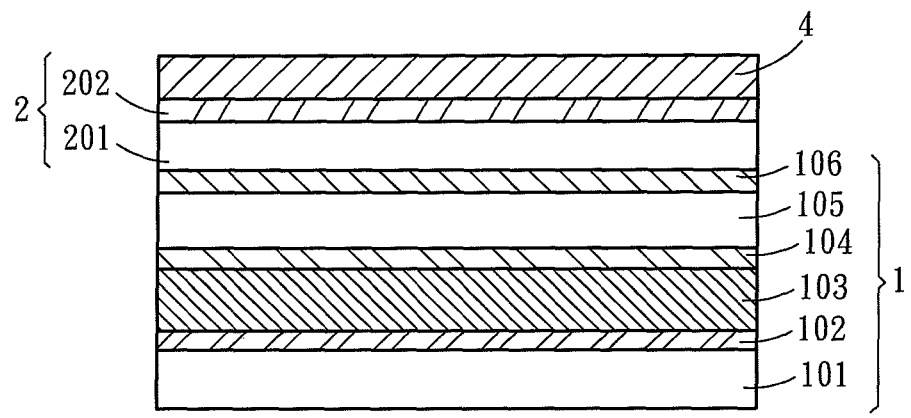
FIG. 1A is a schematic view of the structure of a conventional technique.
Figure 1B:
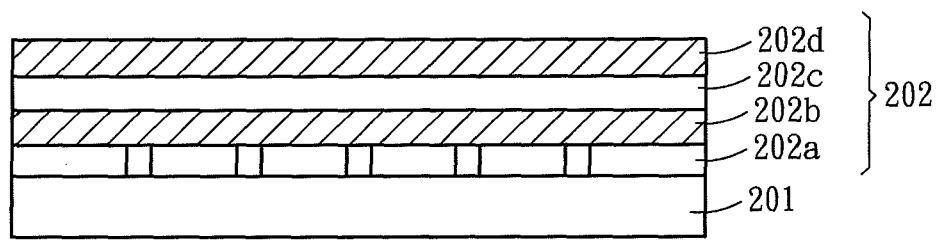
FIG. 1B is a schematic view of the structure of a touch control module of a conventional technique.
Figure 2A:
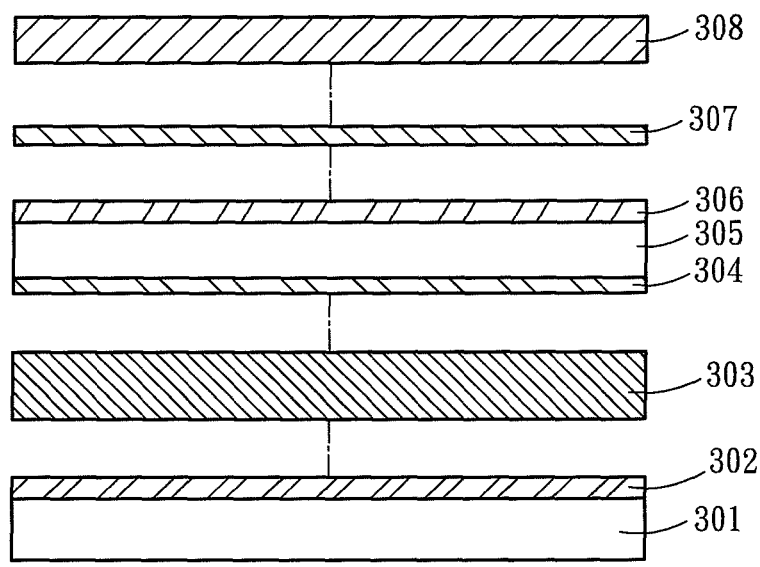
FIG. 2A is an exploded view of another conventional technique.
Figure 2B:
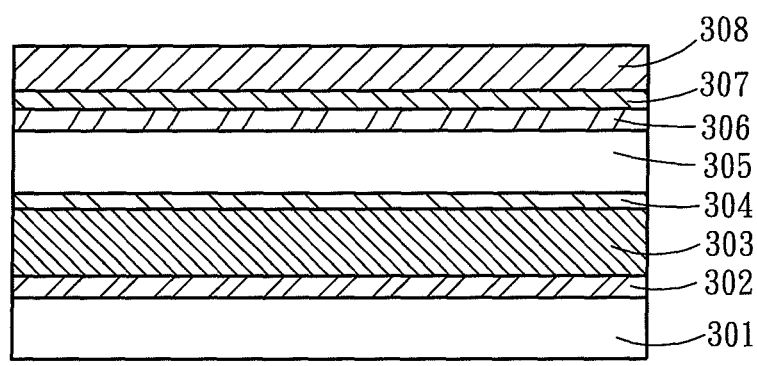
FIG. 2B is a schematic view of the connection structure of another conventional technique.
Figure 3A:
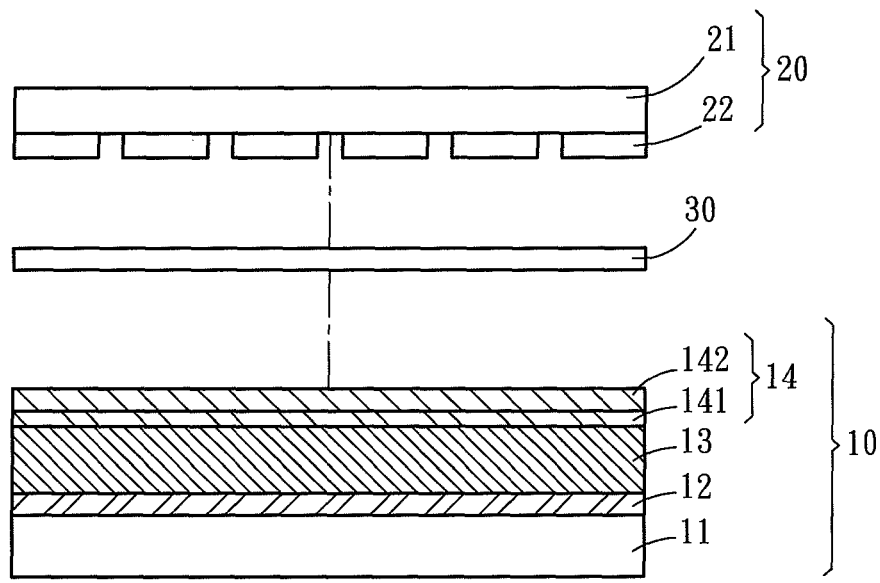
FIG. 3A is an exploded view of the structure of the present invention.
Figure 3B:
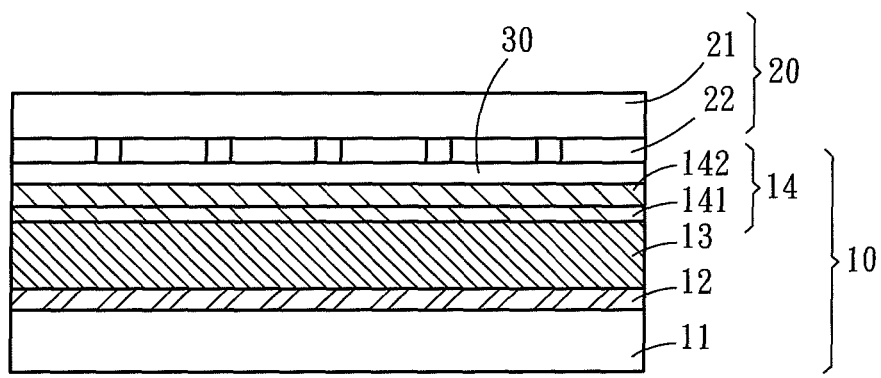
FIG. 3B is a schematic view of the structure of the present invention.

Please refer to FIGS. 3A and 3B, the present invention provides a capacitive touch panel structure which comprises a display module 10, a touch detection module 20 and an optical adhesive layer 30. The display module 10 includes a base substrate 11, a transistor layer 12, a liquid crystal layer 13 and a filter set 14 that are sequentially stacked, wherein the filter set 14 is located on the liquid crystal layer 13. In this embodiment a liquid crystal panel serves as the display module for discussion, but this is not the limitation of the invention. The base substrate 11 can be made of glass. The filter set 14 includes a color filter layer 141 which is adjacent to the liquid crystal layer 13 or the base substrate 11, and a polarization layer 142 which is connected to the color filter layer 141 and is remote from the liquid crystal layer 13 or the base substrate 11. The color filter layer 141 includes light permeable zones with three primary colors: red, blue and green. Through control of the transistor layer 12 and liquid crystal layer 13, the emitted color light through the color filter layer 141 can be selected. The touch detection module 20 includes a cover board 21 and at least one touch control electrode 22 grown on the surface of the cover board 21. In this embodiment, a plurality of parallel touch control electrodes 22 are formed on the cover board 21 that are spaced from each other, wherein the cover board 21 can be made of glass. The optical adhesive layer 30 is interposed between the touch control electrode 22 and the filter set 14 to connect the touch detection module 20 to the display module 10 so that the cover board 21 is disposed at one side of the touch detection module 20 that is remote from the filter set 14. The optical adhesive layer 30 can be made of optical clear adhesive (OCA) or optical clear resin (OCR). The touch control electrode 22 is made of transparent conductive material, such as indium tin oxide (ITO) or the like.

Figure 4A:
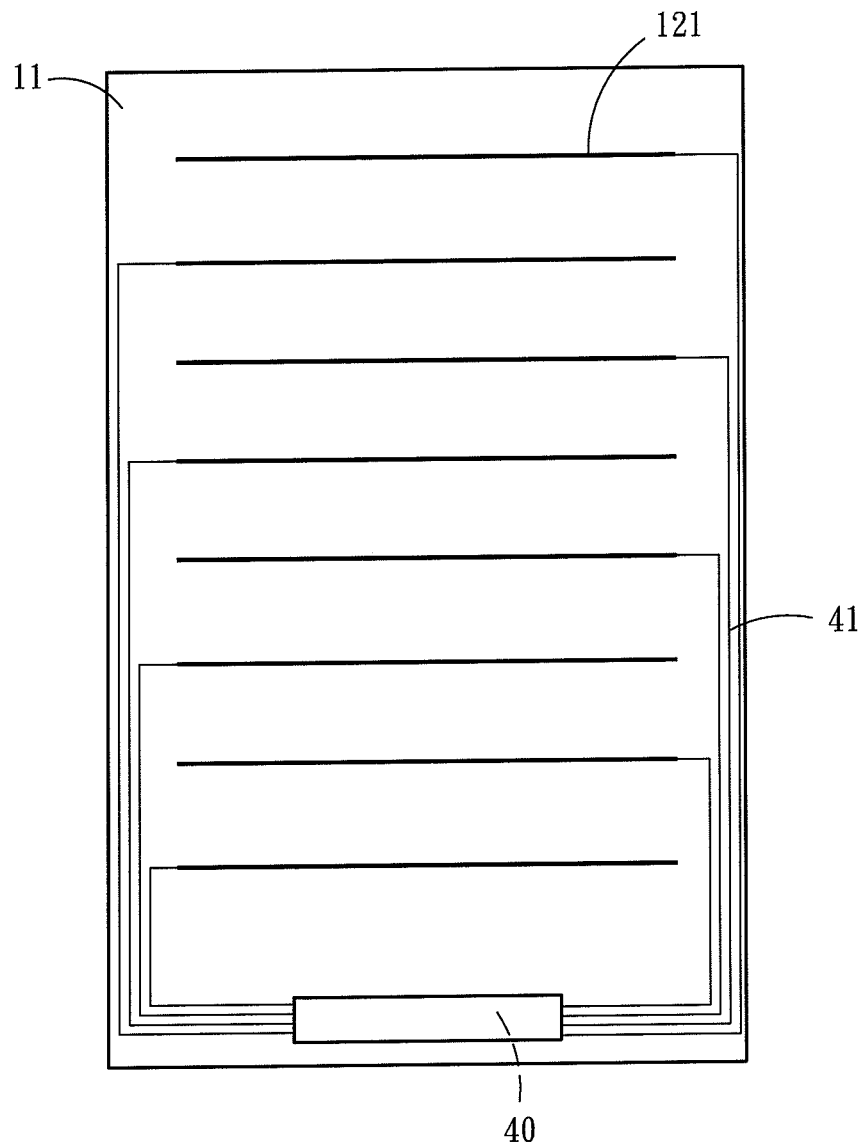
FIG. 4A is a top view of signal line structure of the present invention.

When a user performs touch control operation, the capacitances of the touch control electrode 22 alter in response to contact of the human body. By detecting these alternations of capacitances, the contact location of the human body can be confirmed. In this embodiment, the touch control electrodes 22 are arranged in a matrix with two axes that are perpendicular to each other to respectively detect the alternations of capacitances caused by contact of the human body. By confirming the contact location of the human body through the two axes, the touch control operation is thereby carried out. In addition, the present invention also provides another touch control operation structure as discussed below:

For a detailed description, please refer to FIG. 4A, the transistor layer 12 includes a plurality of parallel signal lines 121 that are spaced from each other and are electrically connected to a control process unit 40 by conductive wires 41. The control process unit 40 outputs an operation signal 50 (referring to FIG. 5) to the signal lines 121 to set on the transistors on the transistor layer 12 to input control signals to regulate the electric field to control the twist direction of liquid crystals in the liquid crystal layer 13. Also referring to FIG. 4B, the touch control electrodes 22 are arranged in parallel and spaced from each other in a direction perpendicular to the signal lines 121, and are further electrically connected to the control process unit 40. The touch control electrodes 22 and signal lines 121 are arranged in a matrix to serve as a detection plane for touch control. It is to be noted that the signal lines 121 can be gate lines or common lines.

Figure 5:
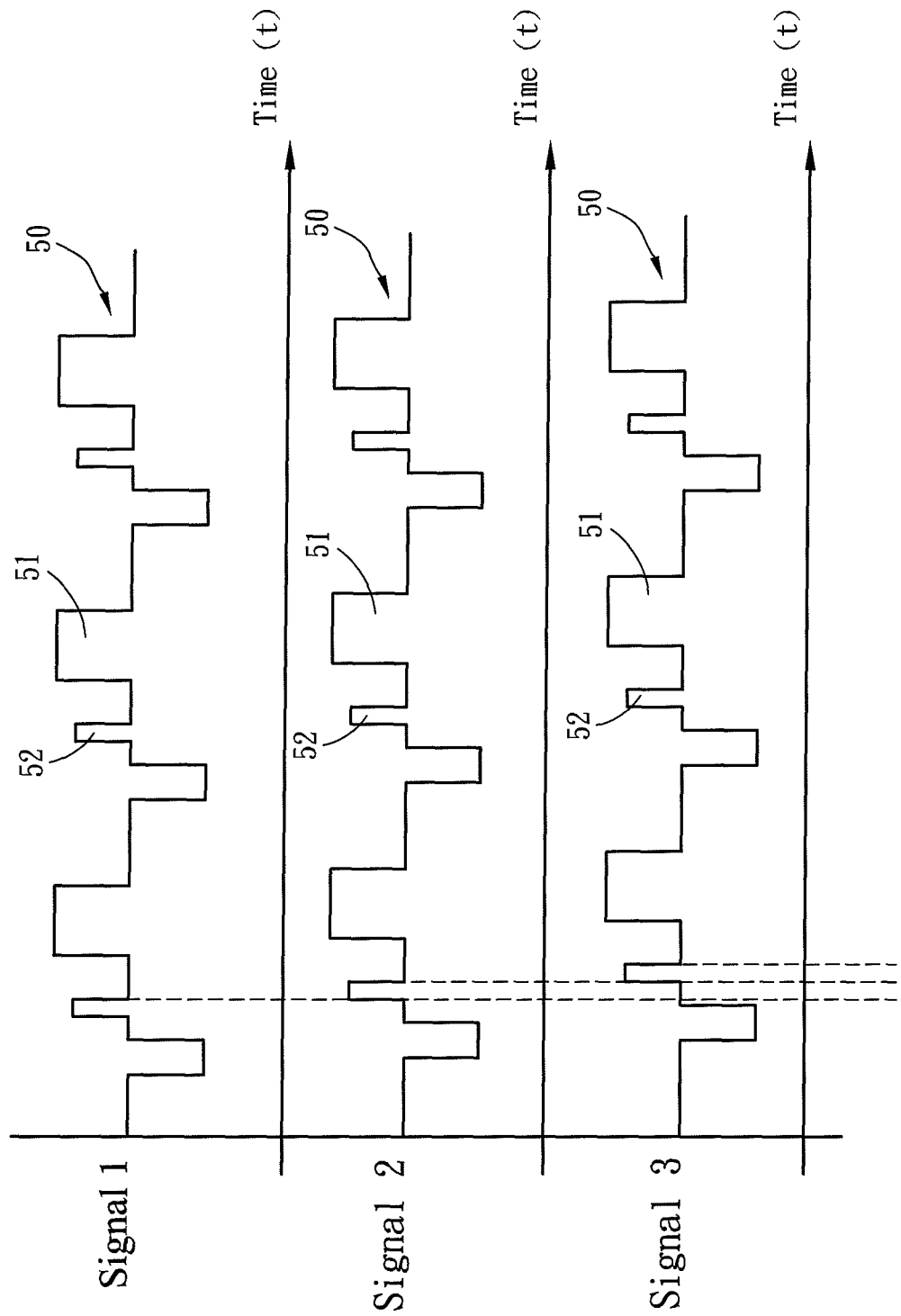
FIG. 5 is a diagram showing output of operation signals according to the present invention.

Please refer to FIG. 5, the control process unit 40 outputs the operation signal 50 to the signal lines 121. The operation signal 50 includes a plurality of liquid crystal switch voltages 51 and a plurality of location detection voltages 52 that are generated periodically. The liquid crystal switch voltages 51 control ON/OFF of the transistors in the transistor layer 12 to allow the control signals to pass through the transistors to control the electric field of the liquid crystal layer 13, thereby regulating the twist direction of the liquid crystals in the liquid crystal layer 13. In the present invention, the location detection voltages 52 are set to be smaller than that of the liquid crystal switch voltages 51, and the time duration of the location detection voltages 52 is also set to be shorter than that of the liquid crystal switch voltages 51. Because the voltage values and the time duration of the location detection voltages 52 are smaller than those of the liquid crystal switch voltages 51, no impact occurs to the ON/OFF of the transistors. Hence the control process unit 40 can sequentially output operation signals 50 to the signal lines 121 to detect the capacitance alternations between the touch control electrodes 22 and the signal lines 121, thereby determining the touch detection location through the two perpendicular axes.

Figure 4B:
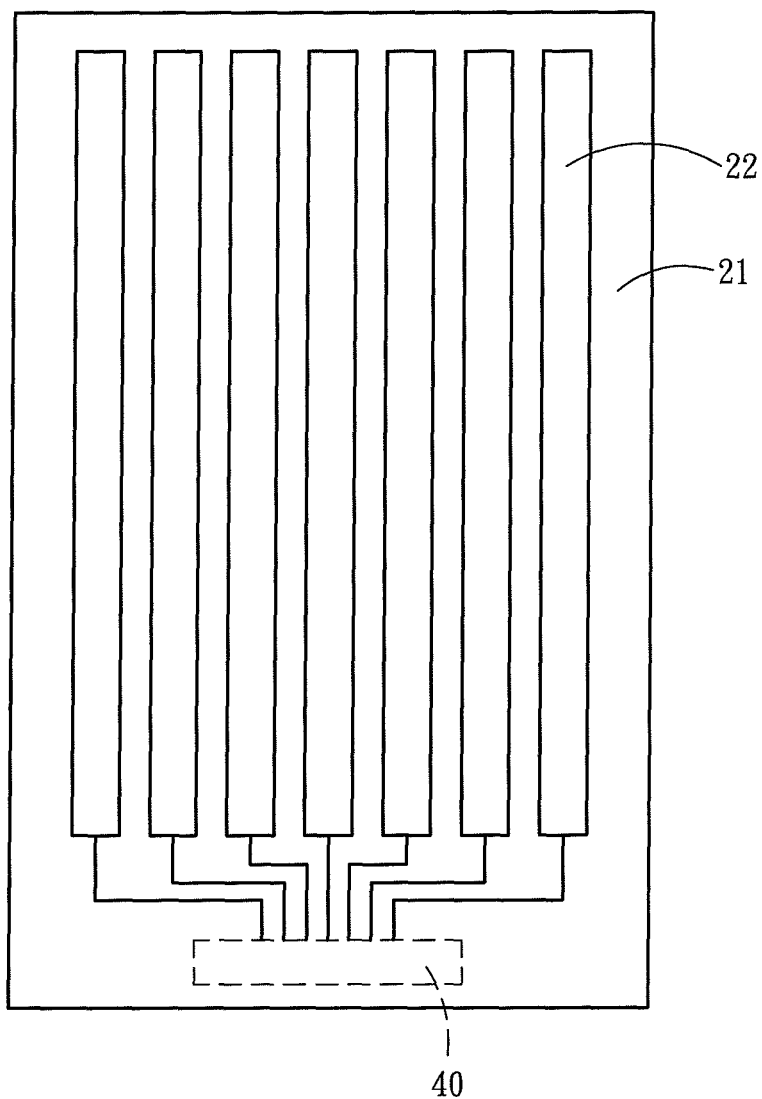
FIG. 4B is a top view of a touch control electrode structure of the present invention.

Please refer to FIGS. 4A, 4B and 5 for an embodiment of the touch control operation according to the invention.

S1: the control process unit 40 sequentially outputs the operation signals 50 to the signal lines 121. Referring to FIG. 5, signal 1, signal 2 and signal 3 represent the operation signals 50 that are inputted in sequence into the signal lines 121. The liquid crystal switch voltages 51 of the operation signals 50 control the ON/OFF of the transistors in the liquid crystal layer 12 so that images are updated by scanning new operation signals.

S2: the control process unit 40 outputs the location detection voltages 52 and simultaneously receives the signals from the touch control electrodes 22.

S3: performing signal determination: If there is no contact on the touch panel by human body, no capacitance alternation takes place between the touch control electrodes 22 and the signals lines 121. If contact on the touch panel by human body takes place, the control process unit 40 sequentially outputs the location detection voltages 52 corresponding to the signal lines 121. With the signals from the touch control electrodes 22, the control process unit 40 can determine the corresponding contact detection location of the human body through the capacitance alternations of the touch control electrodes 22 and the corresponding locations of the input signal lines 121.

Thus, through the touch control method disclosed in the aforesaid embodiment, the touch detection location can be determined by merely the touch control electrodes 22 in one direction incorporating with the signal lines 121 without relying on bidirectional touch control electrodes 22 which are fabricated via many fabrication processes and photo mask etching, thus additional cost can be avoided.

As a conclusion, the present invention provides many features as follows:

1. The touch control electrodes are directly grown on the cover board without the need of adding an extra glass substrate, hence the thickness of the touch panel can be reduced.

2. As the touch control electrodes are formed on the cover board rather than embedded inside the display module, fabrication difficulty can be lower and production yield can be higher.

3. The display module and touch detection module are fabricated simultaneously and separately without being made layer by layer sequentially as the conventional techniques do, hence production efficiency can be improved.

4. As the display module and touch detection module also are brought into production yield tests separately, in the event that the display module or the touch detection module is tested broken, replacement can be made directly, thus solving the problems of conventional techniques that have to be tested after all fabrication processes have been completed and the entire set thereof has to be discarded when defects are found. Therefore, total production yield can be higher and production cost can be lower.

5. By using the touch control electrodes that are arranged in parallel in a single layer to incorporate with the signal lines and control process unit to perform touch location detection, multi-layer touch control electrodes that require multiple photo-mask etching processes can be omitted to further reduce the production cost.

What is claimed is:

1. A capacitive touch panel structure, comprising:
a display module including a base substrate, a transistor layer and a filter set that are sequentially stacked, wherein the filter set is located on the transistor layer, and wherein the transistor layer includes a plurality of parallel signal lines that are spaced from each other;
a touch detection module including a cover board and a plurality of parallel touch control electrodes that are grown on a surface of the cover board and spaced from each other at a distance, wherein the plurality of touch control electrodes are perpendicular to the plurality of signal lines to form a matrix;
an optical adhesive layer interposed between the at least one touch control electrode and the filter set to connect the touch detection module to the display module so that the cover board is disposed at one side of the at least one touch control electrode that is remote from the filter set; and
a control process unit electrically connected with the plurality of signal lines and the plurality of touch control electrodes to sequentially output operation signals to the plurality of signal lines and detect capacitance alterations between the plurality of touch control electrodes and the plurality of signal lines, wherein the operation signals include a plurality of liquid crystal switch voltages and a plurality of location detection voltages that are generated periodically, and wherein the values of the plurality of location detection voltages are respectively smaller than those of the plurality of liquid crystal switch voltages.

2. The capacitive touch panel structure of claim 1, wherein the filter set includes a color filter layer adjacent to the base substrate and a polarization layer connected to the color filter layer and remote from the base substrate.

3. The capacitive touch panel structure of claim 1, wherein the transistor layer and the filter set are interposed by a liquid crystal layer.

4. The capacitive touch panel structure of claim 1, wherein the plurality of location detection voltages are maintained in a time duration shorter than a time duration of the plurality of liquid crystal switch voltages.

5. The capacitive touch panel structure of claim 1, wherein the optical adhesive layer is made of an optical clear adhesive or an optical clear resin.

6. The capacitive touch panel structure of claim 1, wherein the base substrate and the cover board are made of transparent glass.

* * * * *